United States Patent
Niu et al.

(10) Patent No.: US 8,730,827 B2
(45) Date of Patent: May 20, 2014

(54) ESTIMATING QUALITY OF A SIGNAL IN MOBILE WIRELESS COMMUNICATION SYSTEMS

(75) Inventors: Huaning Niu, Milpitas, CA (US); Yi Hsuan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 12/958,235

(22) Filed: Dec. 1, 2010

(65) Prior Publication Data

US 2012/0140713 A1 Jun. 7, 2012

Related U.S. Application Data

(60) Provisional application No. 61/311,174, filed on Mar. 5, 2010.

(51) Int. Cl.
*H04W 24/00* (2009.01)

(52) U.S. Cl.
USPC .......................................... 370/252; 370/329

(58) Field of Classification Search
USPC ............................ 370/329, 328; 455/296, 375
See application file for complete search history.

(56) References Cited

U.S. PATENT DOCUMENTS

| | | | | |
|---|---|---|---|---|
| 6,957,175 | B2* | 10/2005 | Shin et al. | 702/191 |
| 8,331,309 | B2* | 12/2012 | Marsh et al. | 370/330 |
| 8,369,793 | B2* | 2/2013 | Molnar | 455/67.13 |
| 2005/0249304 | A1 | 11/2005 | Takano et al. | |
| 2008/0159217 | A1* | 7/2008 | Chang et al. | 370/329 |
| 2008/0299983 | A1* | 12/2008 | Kwak et al. | 455/446 |
| 2010/0035645 | A1* | 2/2010 | Chang et al. | 455/522 |
| 2010/0272218 | A1* | 10/2010 | Yeh et al. | 375/330 |
| 2010/0278063 | A1* | 11/2010 | Kim et al. | 370/252 |
| 2010/0322109 | A1* | 12/2010 | Ahn et al. | 370/254 |
| 2011/0014909 | A1* | 1/2011 | Han et al. | 455/423 |
| 2011/0116480 | A1* | 5/2011 | Li et al. | 370/332 |
| 2011/0134759 | A1* | 6/2011 | Kim et al. | 370/242 |
| 2011/0158168 | A1* | 6/2011 | Chen et al. | 370/328 |
| 2011/0194423 | A1* | 8/2011 | Cho et al. | 370/252 |
| 2011/0267996 | A1* | 11/2011 | Guan et al. | 370/280 |
| 2012/0307939 | A1* | 12/2012 | Kalyani et al. | 375/316 |

OTHER PUBLICATIONS

IEEE 802_6m_09_0034r2_20090924_SDD.*
International Search Report and Written Opinion for PCT Patent Application No. PCT/US2011/025183, mailed Sep. 20, 2012, 5 pages.

(Continued)

*Primary Examiner* — Bunjob Jaroenchonwanit
(74) *Attorney, Agent, or Firm* — Kacvinsky Daisak Bluni PLLC (57) ABSTRACT

A mobile station (MS) to determine signal quality values is disclosed. The MS may include a transmitter and a receiver and the receiver may determine a signal power value, a noise power value, and an interference power value of a signal received from antennas. The receiver may determine the signal power value and the interference value using a second preamble included in a super-frame of the signal, wherein the second preamble includes cell information. The receiver may determine a noise power value of the signal received from the plurality of antennas using unoccupied orthogonal frequency division multiple access (OFDMA) tones of a first preamble included in the super-frame of the signal, wherein the first preamble includes carrier information. The receiver may also use the fractional frequency reuse (FFR) and MIMO features to determine signal quality values using the signal power value, the noise power value, and the interference power value.

20 Claims, 4 Drawing Sheets

(56) References Cited

OTHER PUBLICATIONS

IEEE Draft, "IEEE Standard for Local and Metropolitan Area Networks—Part 16: Air Interface for Broadband Wireless Access Systems", IEEE Std. 802.16-2009, May 29, 2009.

IEEE Draft, "IEEE 802.16m, System Description Document (SDD)", IEEE 802.16m-09/0034r2, Sep. 24, 2009.

* cited by examiner

ESTIMATING QUALITY OF A SIGNAL IN MOBILE WIRELESS COMMUNICATION SYSTEMS

The present application claims the benefit of U.S. provisional application Ser. No. 61/311,174, filed Mar. 5, 2010, the entire content of which is incorporated by reference herein.

BACKGROUND

Rapid advancements in communication technology has led to evolvement of high speed and better quality wired and wireless communication systems. However, with the advancements in the wireless technology, the need for a improving the signal quality is ever increasing. For example, wireless metropolitan area network (WMAN) such as Worldwide Interoperability for Microwave Access (WiMAX) and/or cellular systems e.g., Long Term Evolution (LTE) may use advanced communication technologies including the current wireless communication standards such as IEEE® 802.16. A WiMAX mobile station which may operate according to the Institute of Electrical and Electronics Engineers (IEEE) 802.16e/m standards may use Multiple Input, Multiple Output (MIMO) techniques to transmit and receive signals over the uplink (UL) and the downlink (DL).

Mobile WiMAX may support broadband wireless technology for fixed and mobile broadband networks to enable broadband data services including data, streaming video, and voice. Mobile WiMAX systems may operate in accordance with standards such as the Institute for Electronic and Electrical Engineers (IEEE) 802.16e-2005 standard, "Air Interface for Fixed and Mobile Broadband Wireless Access Systems," (February, 2005) and, its evolution, the IEEE 802.16m standard, "Advanced Air Interface." In 802.16m, the link adaption is based on Channel Quality Information (CQI), which may be effective Carrier to interference-plus-noise ratio (CINR) derived based on different MIMO scheme. The physical CINR and Receive Signal Strength Indicator (RSSI) may be mainly used for Fractional Frequency Reuse (FFR) response, Handover (HO) and SCAN. Current approaches to measure such critical indicators (CINR and RSSI) of signal effectiveness include using pilot portions in the control signals. However, such pilot portions are pre-coded and power boosted. As the pre-coding gain is unknown, using pilots or portions of a pilot to determine the signal quality may result in inaccurate indications of signal quality.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of an approach used to estimate signal quality in a mobile wireless communication system. In the following detailed description, numerous specific details are set forth in order to provide a thorough understanding of the embodiments described below. However it will be understood by those of ordinary skill in the art that the embodiments described herein may be practiced without these specific details. In other instances, well-known methods, procedures, components and circuits have not been described in detail so as not to obscure the embodiments described herein.

Some portions of the detailed description, which follow, are presented in terms of algorithms and symbolic representations of operations on data bits or binary digital signals. These algorithmic descriptions and representations may be the techniques used by those skilled in the signal processing arts or/and in wireless communication arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer and/or computing system and/or medium access controller (MAC) and/or communication processor, or similar electronic computing device, that manipulate and/or transform data represented as physical, such as electronic, quantities within the computing system's registers and/or memories into other data similarly represented as physical quantities within the computing system's memories, registers or other such information storage, transmission or the like. In addition, the term "plurality" may be used throughout the specification to describe two or more components, devices, elements, parameters and the like. For example, "plurality of mobile stations" describes two or more mobile stations.

It should be understood that the embodiments described herein may be used in a variety of applications. Although the embodiments described herein are not limited in this respect, the circuits and techniques disclosed herein may be used in many apparatuses such as communication devices of a radio system. The communication devices intended to be included within the scope of the present invention include, by way of example only, mobile stations, base stations and access points of radio systems such as, for example wireless local area network (WLAN), wireless metropolitan area network (WMAN) two-way radio transmitters, digital system transmitters, analog system transmitters, cellular radiotelephone transmitters, digital subscriber lines, LTE cellular systems and the like.

WMAN, LTE, WLAN mobile stations and/or base stations which intended to be within the scope of the embodiments described herein include, although are not limited to, may include transmitters and receivers for transmitting and receiving spread spectrum signals such as, for example, Frequency Hopping Spread Spectrum (FHSS), Direct Sequence Spread Spectrum (DSSS), and the like. The spread spectrum signals may be either in Frequency Division Multiplexing (FDM) (such as Orthogonal Frequency Division Multiplexing/Orthogonal Frequency-Division Multiple Access (OFDM/OFDMA) or in time division multiplexing (TDM) or in Code Division Multiple Access (CDMA), if desired.

Some embodiments described herein may be implemented, for example, using a machine-readable medium or article which may store an instruction or a set of instructions that, if executed by a machine, cause the machine to perform a method and/or operations in accordance with embodiments described herein. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, assembly language, machine code, or the like.

In accordance with embodiments described herein, a channel may be a physical transfer medium. The physical transfer medium may be used to transfer signals such as, for example, informative data signals, training signals, pilot signals, subcarriers signals, preamble signals and the like, that may be modulated by one or more modulation scheme. Furthermore, the channel may be a combination of the physical transfer medium, components of the transmitter and/or the receiver, for example path loss, noise, interference or the like. It should be understood to the skilled artisan that embodiments of the invention may operate with many types of signals, which partially mention above, and the invention is in no way limited to the above mentioned signals.

Figure 1:
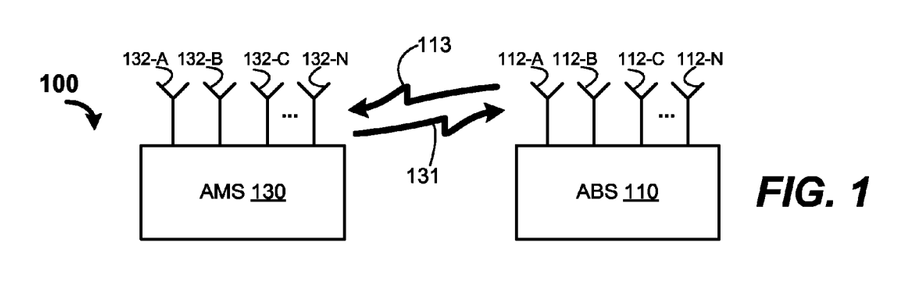
FIG. 1 illustrates a portion of a communication system 100 in accordance with one embodiment.

An embodiment of a communication system 100 such as, for example, a wireless metropolitan area network (WMAN) is illustrated in FIG. 1. For example, the communication system 100 may include one or more platforms or stations (STA) including base stations, advanced base stations (ABS), subscriber stations, mobile stations, and/or advanced mobile STAs (AMS) capable of heterogeneous wireless communication by accessing a plurality of wireless networks and/or wired networks and capable of accessing a single wireless network or a plurality of networks at any one time. For example, the AMSs 130 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices.

The communication system 100 may include an advanced base station ABS 110, an advanced mobile station AMS 130, an uplink (UL) 131 and a downlink (DL) 113. UL 131 and DL 113 may include one or more channels. In one embodiment, the ABS 110 and AMS 130 may include one or more antennas 112-A to 112-N and 132-A to 132-N, respectively. In one embodiment, the antennas 112 and 132 may include a dipole antenna, an omni-directional antenna, an internal antenna, a Yagi antenna, or the like.

In one embodiment, the ABS 110 may mandate measurement of signal quality values by sending a control signal such as a 'quality estimate' signal. In one embodiment, the ABS 110 may send such a signal at fixed or varying intervals of time or in response to an occurrence of an event. In one embodiment, the ABS 110 may send such a control signal on the DL 113 along with other information units or frames.

In one embodiment, the AMS 130 may determine signal quality values of a signal received from the one or more antennas (MIMO). In one embodiment, the AMS 130 may include a transmitter and a receiver portion and the receiver may determine a signal power value, a noise power value, and an interference power value of a signal received from a plurality of antennas. In one embodiment, the receiver may determine the signal power value and the interference value using the information (segment and cell information) included in the preambles of a super-frame of the signal. In one embodiment, the receiver may determine a noise power value of the signal received from the plurality of antennas using unoccupied orthogonal frequency division multiple access (OFDMA) tones of the preambles included in the superframe of the signal. In one embodiment, the receiver may also use the fractional frequency reuse (FFR) and MIMO features to determine signal quality values using the signal power value, the noise power value, and the interference power value.

In one embodiment, the AMS 130 may estimate the signal quality values such as CINR, SIR, and DL-NI using the preambles included in the super frames received on the DL 113 in response to receiving the 'quality estimate' signal. In one embodiment, the robustness to severe interference and fast detection of the synchronization channel or synchronization preamble may be crucial to fast cell selection, system timing and frequency acquisition cell coverage, and cell edge performance, as well as scan latency for the AMSs. In one embodiment, the preamble may be used for timing and carrier synchronization and may include sufficient number of distinct codes such that the neighboring ABSs may have a unique preamble. In one embodiment, the each super-frame may include two advanced preambles: a primary advanced preamble (PA-Preamble) and a secondary advanced preamble (SA-preamble).

In one embodiment, the AMS 130 may use the information encoded in the primary advanced preamble (PA-preamble) and the secondary advanced preamble (SA-Preamble) included in each of the frames. In one embodiment, the AMS 130 may, additionally, use features such as MIMO and FFR to determine estimates of the signal quality values. In one embodiment, the AMS 130 may determine the estimates such as mean and variance for each signal quantity before reporting such signal quality values to the ABS 110 using appropriate messages.

Figure 2:
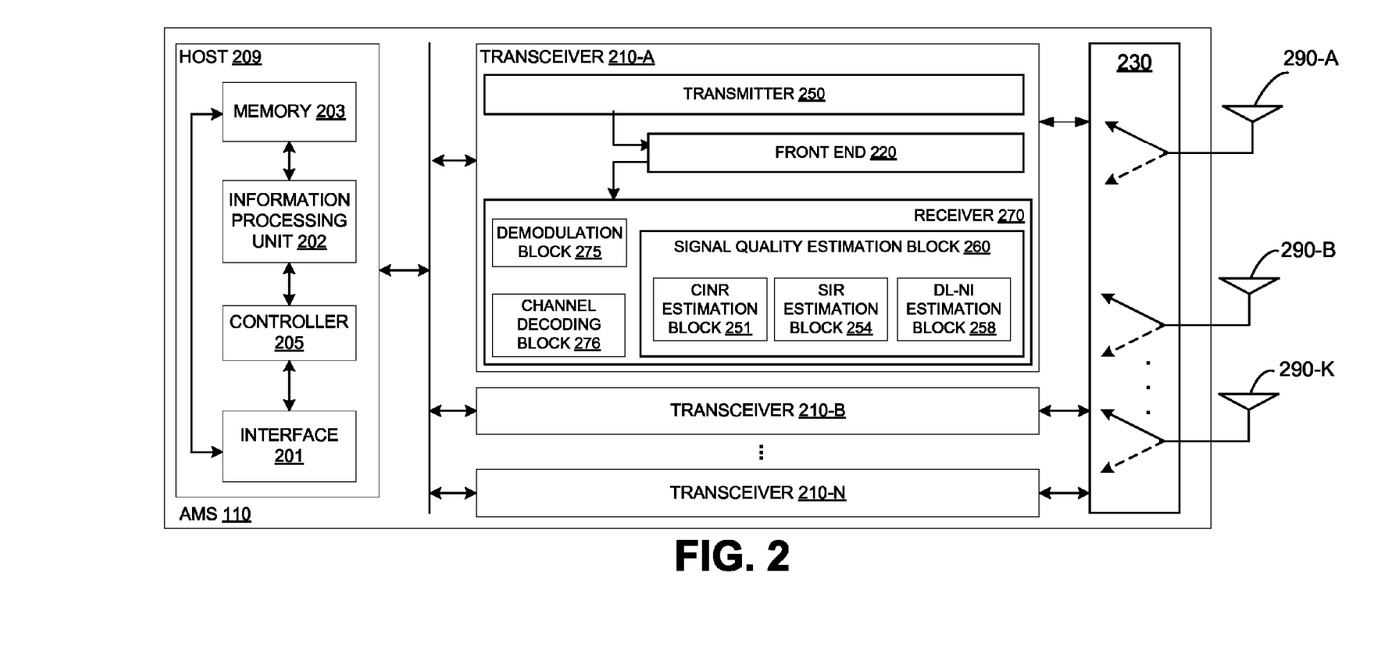
FIG. 2 illustrates a block diagram of an advanced mobile station (AMS) for estimating signal quality values using preamble sequences in accordance with one embodiment.

An embodiment of a block diagram of the AMS 130, which may estimate the signal quality values using preamble sequences is illustrated in FIG. 2. In one embodiment, the AMS 130 may comprise a host 209, which may further include an interface 201, an information processing unit 202, and a memory 203, and a controller 205. In one embodiment, the AMS 130 may also include one or more transceivers 210-A to 210-N, a switch 230, and multiple antennas 290-A to 290-K. In one embodiment, the AMS 130 may be represent or may be included in a computer platform, a laptop computer, a mobile internet device, handhelds, smart phones, and televisions.

In one embodiment, the interface 201 may couple the communication portion (comprising the transceivers 210, switch 230, and the antennas 290) of the AMS 130 to the host 209. In one embodiment, the interface 201 may provide physical, electrical, and protocol interface between the communication portion of the AMS 130 and the other blocks within the host 209. In one embodiment, the controller 205 may control the modulation and demodulation techniques selected by the transceivers 210. In one embodiment, the controller 205 may control communication parameters such as the transmission rate, bit error rate, and other such parameters. In one embodiment, the host 209 may receive information units from the communication portion of the AMS 130 and may also generate information units, which may be provided to the communication portion of the AMS 130.

In one embodiment, the switch 230 may couple a transmitter of the transmitters 210 to the antenna 290 on time sharing basis, for example. In one embodiment, the switch 230 may couple a specific transceiver 210 to the antenna 290 in response to an event such as a selection control signal of the controller 205. In other embodiment, the switch 230 may be provided with intelligence to couple an appropriate transmitter 210 to the antenna 290. In one embodiment, the switch 230 may couple the antenna 290 to the transmitter 250 while the transmitter 250 may be ready to transmit signals out to a receiver in other system. In one embodiment, the switch 230 may couple the antenna 290 to the receiver 270, while the antenna 290 has generated signals to be provided to the receiver 270. In one embodiment, the antenna 290 may be coupled to a switch 230.

In one embodiment, the transceiver 210-A may comprise a front end 220, a transmitter 250, and a receiver 270. In one embodiment, each of the transceiver 210-B to 210-N may comprise a transmitter and receiver similar to the transmitter 250 and the receiver 270 of the transmitter 210-A. In one embodiment, the transmitter 250 may receive one or more information units and perform functions such as encoding and modulation and may add preambles such as PA-preamble and SA-preamble before sending a modulated signal to the front end block 220.

In one embodiment, the front end block 220 may exchanges signals between the antennas 290, the transmitter 250 and the receiver 270. In one embodiment, the front end block 220 may prepare the modulated signal for wireless transmission. In turn, the modulated signal may be transmitted wirelessly via one of the antennas 290. Also, while receiving signals from the antennas 290, the front end block 220 prepares wireless signals received via one of the antennas 290 for the demodulation and estimation of signal quality values in the receiver 270. In one embodiment, the front end block 220 may include amplifiers, filters, up-converters, down-converters, and such other components.

In one embodiment, the receiver 270 may perform various functions such as analog to digital conversion of the received signal, demodulation on the received digital signal, and estimation of signal quality values. The demodulation block 275 may perform demodulation using techniques such as Fast Fourier Transforms (FFTs). The demodulated signal so produced may be further processed by the signal quality estimation block 260 and the channel decoding block 276. The channel decoding block 276 may process the non-preamble portions of the demodulated signal. The channel decoding block 26 generate symbols from after processing the non-preamble portions of the demodulated signal. Also, the channel decoding block 260 may perform various operations on these symbols, such as de-interleaving, FEC decoding, and/or de-randomizing before sending an information unit to the host module 209.

In one embodiment, the signal quality estimation block 260 may estimate signal quality values after receiving the preambles such as the PA-preamble and SA-preambles. In one embodiment, the signal quality estimation block 260 may include a CINR estimation block 251, a SIR estimation block 254, and DL-NI estimation block 258. In one embodiment, in response to a mandate from the ABS 110 to measure CINR, the CINR estimation block 251 may obtain a CINR measurement from the SA-preamble for handover (HO), Scan, and fractional frequency reuse (FFR). From successive measurements of CINR, the CINR estimation block 251 may estimate the CINR Mean and Variance and update the estimated CINR Mean and Variance values through a proper message (e.g., AAI_FFR-REP, AAI_HO-REQ, AAI_SCN-REP message defined in IEEE® 802.16m standards). Mean and variance statistics for CINR may be reported in decibels (dB), following the quantization requirement in each message.

Figure 5:
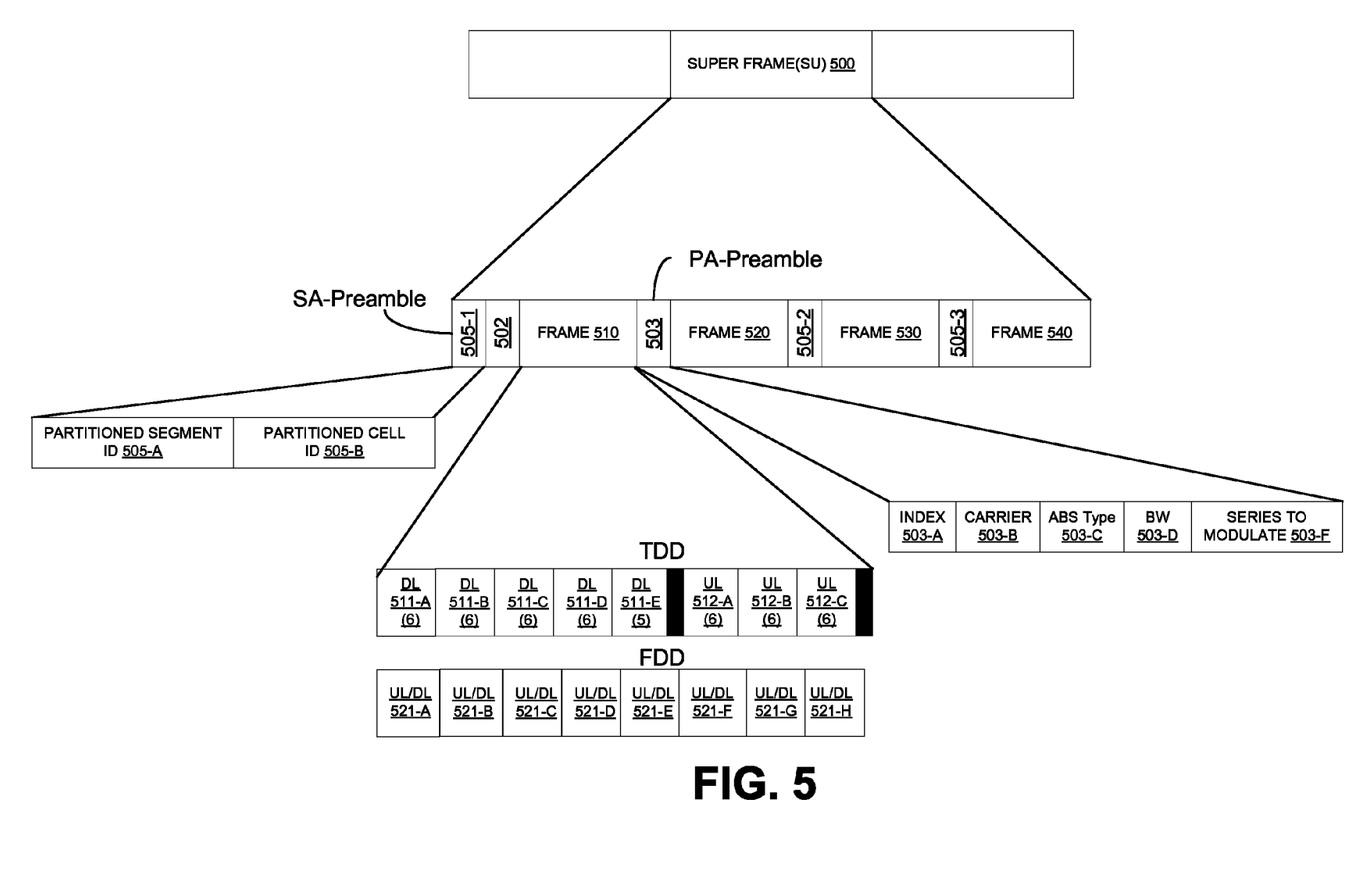
FIG. 5 illustrates the structure of a super frame including a primary preamble and one or more secondary preambles, which may be used to estimate signal quality in accordance with one embodiment.

In one embodiment, the CINR estimation block 251 may determine the CINR quality values (CINR Mean and Variance) using the information present in various fields of PA-preamble and SA-preamble portions of the frames provided within a super-frame (depicted in FIG. 5). In one embodiment, the PA-preamble may include parameters representing system bandwidth and carrier configuration and the SA-preamble may include parameters that represent segment identifiers (segment IDs) and cell identifiers (cell IDs), which may be partitioned to support advanced base stations and femto base stations. In one embodiment, the CINR estimation block 251 may also use features such as MIMO and FFR. In one embodiment, the CINR estimation block 251 may determine the mean and the variance. In one embodiment, the mathematical equations depicting the estimation of the CINR quality values are discussed below.

In one embodiment, in response to receiving a mandate from the ABS 110 to estimate signal to interference ratio, the SIR estimation block 254 may estimate a SIR measurement from the SA-preamble for uplink open loop (UL OL) power control. From a succession of these measurements, the SIR estimation block 254 may estimate the SIR quality values and update estimated SIR values (SIR mean) and report the SIR quality values through Uplink Power Status Report Header. The SIR quality values may be reported in decibels dB, following the quantization requirement in Uplink Power Status Report Header. In one embodiment, the mathematical equations depicting the estimation of the SIR quality values are discussed below.

In one embodiment, in response to receiving a mandate from the ABS 110 to estimate downlink noise and interference ratio (DL-NI), the DL-NI estimation block 258 may estimate a DL-NI measurement from the SA-preamble for downlink FFR operation. In one embodiment, the DL NI estimation block of 258 may report the DL-NI levels using FEP-REP message after receiving a FFR-CMD message from the ABS 110. From the successive measurements of DL-NI, the DL-NI estimation block 256 may determine the DL-NI values and update the estimated DL-NI mean and variance values. In one embodiment, the mathematical equations depicting the estimation of the SIR quality values are discussed below.

Before providing the mathematical approach to estimate the CINR, SIR, and DL-NI, the sources of interference affecting a sector of a cell and fractional frequency reuse (FFR) approach is discussed below, respectively, in FIGS. 3 and 4.

Figure 3:
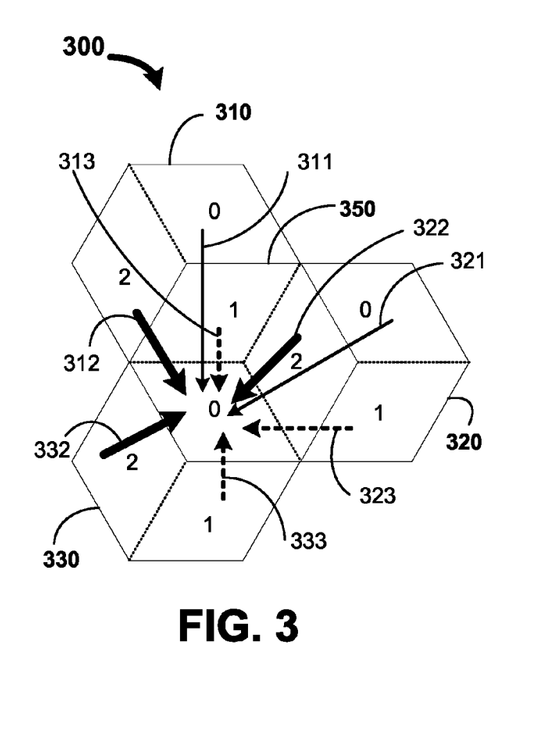
FIG. 3 illustrates interference sources in a power boosted reuse 3 partition of a sector 0 of a cell in accordance with one embodiment.

An embodiment of a cell structure 300 depicting interferences sources in a power boosted reuse 3 partition of a sector (sector 0) of a cell is depicted in FIG. 3. In one embodiment, the cell structure 300 may include three cells 310, 320, and 330 arranged as depicted in FIG. 3 and such an arrangement may provide an additional cell 350 (formed by the sectors 0, 1, and 2 of the cells 330, 310, and 320, respectively). In one embodiment, each cell 310, 320, 330, and 350 may include sectors 0, 1, and 2. In one embodiment, the power boosted (FP1_Power) in the reuse-3 partition of the sectors 0 of the cells 310 and 320 may cause interference in sector 0 of cell 330. In one embodiment, the interference caused by power boosting in sectors 0 of the cells 310 and 320 on the sector 0 of the cell 330 may be represented, respectively, by indicators 311 and 321.

However, in one embodiment, the power de-boosting (FP2_Power) in sectors 1 of the cells 310, 320, and 330 may also cause interference in sector 0 of cell 330. In one embodiment, the interference caused by power de-boosting (FP2_Power) in sectors 1 of the cells 310, 320, and 330 on the sector 0 of the cell 330 may be represented by indicators (dotted lines) 313, 323, and 333, respectively. In one embodiment, the power de-boosting (FP3_Power) in sectors 2 of the cells 310, 320, and 330 may also cause interference in sector 0 of the cell 330. In one embodiment, the interference caused by power de-boosting (FP3_Power) in sectors 2 of the cells 310, 320, and 330 on the sector 0 of the cell 330 may be represented by the indicators 312, 322, and 323, respectively.

Figure 4:
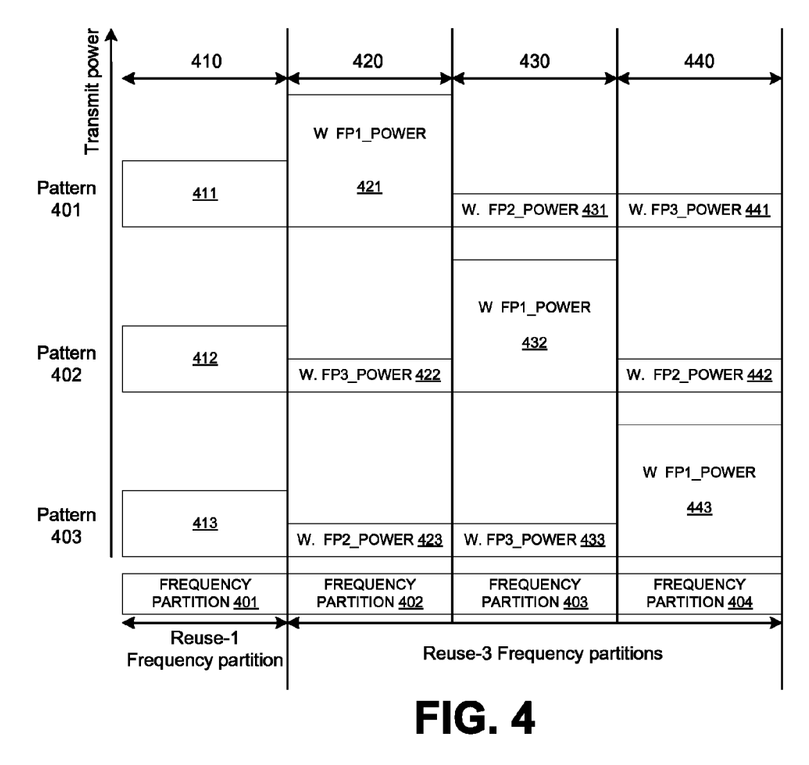
FIG. 4 illustrates a fractional frequency reuse (FFR) in accordance with one embodiment.

An embodiment of relationship diagram 400 illustrating the concept of fractional frequency reuse (FFR) is depicted in FIG. 4. In one embodiment, while using fractional frequency reuse technique the subcarriers across the entire frequency band may be grouped into frequency partitions such as frequency partition 401, frequency partition 402, frequency partition 403, and frequency partition 404 as depicted in regions 410, 420, 430, and 440, respectively. In one embodiment, each frequency partition (frequency partition 401, frequency partition 402, frequency partition 403, and frequency partition 404) may be associated with a different reuse factor. For example, the frequency partitions 401, 402, 403, and 404 may be associated with a frequency reuse factor of RU1, RU2, RU3, and RU4, respectively.

In one embodiment, the received signal quality may be improved by serving the AMSs in the frequency partitions, which may be associated with higher frequency reuse factor. In one embodiment, the AMSs located in the cell boundaries such as sectors 0, 1, and 2 of the cell 350 may be served in frequency partitions associated with higher frequency reuse factors. Further, the received signal quality of the AMSs suffering from inter-cell interference may also be improved by serving such AMSs in the frequency partitions with higher frequency reuse factor. On the other hand, in one embodiment, the advance base station may use frequency partitions with lower frequency reuse factor to serve the AMSs which may not suffer from inter-cell interference or the AMSs operating within the central area of the cells. Such an approach may allow the ABS to serve more advance mobile stations with better spectral efficiency. In one embodiment, fractional frequency reuse (FFR) techniques may be effectively used for interference mitigation. Also, compared to the hard reuse deployment, FFR techniques may be used to balance interference avoidance and throughput gain, by adaptively adjust the transmit power.

In one embodiment, the relationship diagram 400 may include the frequency partition 401 and the frequency partitions 402 to 404. In one embodiment, the frequency partition 401 may be associated with a reuse factor of 1 and the frequency partitions 402 to 404 may be associated with a reuse factor of 3. In one embodiment, the frequency partitions 401 to 404 may represent a SA-preamble. In one embodiment, only one tone (or frequency partition) may be occupied out of the 3 adjacent tones in a SA-preamble. For example, in the frequency partition 402 (region 420) a tone FP1_Power 421 is occupied out of the three adjacent tones 411, FP2_Power 431, and FP3_Power 441. Similarly, in the region 430, a tone FP1_Power 432 is occupied, in the frequency partition 403, out of the adjacent tones 412, FP3_Power 422, and FP 2_Power 442. Likewise, in the region 440, a tone FP 1_Power 443 is occupied out of the adjacent tones 413, FP2_Power 423, and FP3_Power 433. As a result, the signal power may be measured using only the occupied tones in the SA-preamble.

An embodiment of a super-frame 500 is depicted in FIG. 5. In one embodiment, a super-frame 500 may include four frames 510, 520, 530, and 540 and a PA-preamble 503 is positioned at the start of the frame 520 and SA-preambles 505-1, 505-2, and 505-3 or positioned at the start of the frames 510, 530, and 540, respectively. Also, a super frame header 502 is positioned between the SA-preamble 505-1 and the start of the frame 510. Each frame may be further divided into sub frames DL 511-A to DL 511-E and UL 512-82 512-C while using time division multiplexing techniques. However, while using frequency division multiplexing techniques, the frame 510 may be divided into sub frames UL/DL 521-A to UL/DL 521-H.

In one embodiment, the PA-preamble 503 may include information related to system bandwidth and carrier configuration. In one embodiment, the system bandwidth information (e.g., 5 MHz, 10 MHz, 20 MHz) may be included in the field "BW 503-D" and the carrier configuration information (e.g., fully configured, partially configured) may be included in the field "carrier 503-B". In one embodiment, information on the type of ABS (e.g., ABS included in NBR_ADV, ABS not included in NBR_ADV) may be included in the field "ABS Type 503-C" and the SERIES TO MODULATE field 503-E may include the series to be modulated. In one embodiment, SA-preamble 505 may include information related to segment ID and cell ID. For example, the SA-preamble 505-1 may include PARTITIONED SEGMENT ID field 505-A and PARTITIONED CELL ID field 505-B.

Cinr Mean and Varaince Measurements

In one embodiment, the ABS 110 may mandate CINR measurements by sending 'quality estimate' signal and the CINR estimation block 251 (of the AMS 130) may perform a CINR measurement using the SA-preamble 505 for HO, Scan and AAI_FFR-REP. From successive measurements, the CINR estimation block 251 may determine and update estimates of the mean and variance of the CINR, and may report the estimates through a message (e.g., AAI_FFR-REP, AAI_HO-REQ, AAI_SCN-REP message).

In one embodiment, mean and variance statistics for CINR may be reported in units of dB, following the quantization requirement in each message. In one embodiment, the approach used to estimate the CINR of a single measurement may be performed using the signal quality estimation block 260. In one embodiment, the estimated mean and variance of CINR may be determined without loss of generality as given by Equation (1) below:

$$CINR[k] = \sum_{j=1}^{N_r} CINR[k]_j = \sum_{j=1}^{N_r} \frac{P_{signal}[k]_j}{P_{interference}[k]_j + P_{noise}[k]_j} \quad \text{Equation (1)}$$

wherein $CINR[k]$ is the CINR for measurement k;

$CINR[k]_j$ is CINR for measurement k at $j^{th}$ received antenna (e.g., 290-C) among the antennas 290-A to 290-K, $P_{signal}[k]_j$ is the signal power for measurement k at $j^{th}$ received antenna excluding SA-preamble boosting, $P_{interference}[k]_j$ is the interference power for measurement k at $j^{th}$ received antenna excluding SA-preamble boosting.

$P_{noise}[k]_j$ is the noise power for measurement k at $j^{th}$ received antenna.

$N_r$ is the number of receive antennas (290-A to 290-K) at AMS 130.

The estimation of the noise power $P_{noise}[k]_j$ may be measured from the interference-free region specific to the implementation of the AMS 130. In one embodiment, the estimation of the interference power $P_{interference}[k]_j$ may be determined using the Equation (2) below:

$$P_{interference}[k]_j = P_{Seg0} \cdot P_{interference\_T_0}[k]_j + P_{Seg1} \cdot P_{interference\_T_1}[k]_j + P_{Seg2} \cdot P_{interference\_T_2}[k]_j \quad \text{Equation (2)}$$

wherein

Ts may represent a set of measurement indices derived from the SA-preamble 505 tone indices of segment 's' (=0,1, 2, . . . );

$P_{interference\_T_s}[k]_j$ represent the interference power level of segment 's' at $j^{th}$ received antenna (290-C) determined from the SA-preamble (505) measurement.

$P_{Segi}$ may represent a linear power boosting or de-boosting level for segment 'I'. For example, in reuse-1 deployment, $P_{Seg0}=P_{Seg1}=P_{Seg2}=1$. For segment '0' of reuse-3 deployment, $P_{Seg0}=1$ and $P_{Seg1}=P_{Seg2}=0$. For the power boosting reuse-3 partition of segment 0 in FFR deployment, $P_{Seg0}=$FP1_Power, $P_{Seg1}=$FP2_Power, $P_{Seg2}=$FP3_Power, wherein FP1_Power is the linear power boosting level and FP2_Power and FP3_Power are linear power de-boosting levels.

In one embodiment, the measured signal power for boosted reuse-3 FP may be multiplied by $P_{seg0}=$FP1_Power to obtain $P_{signal}[k]_j$. The mean CINR statistics (in decibels) may be derived from a multiplicity of single message using Equation (3) below.

$$\hat{\mu}_{CINR}[k] = \begin{cases} CINR[0]_{dB} & k = 0 \\ (1-\alpha_{avg})^{n+1}\hat{\mu}_{CINR}[k-1] + \\ (1-(1-\alpha_{avg})^{n+1})CINR[k]_{dB} & k > 0 \end{cases} \quad \text{Equation (3)}$$

wherein $CINR[k]_{dB}=10 \log_{10}(CINR[k])$;

$\alpha_{avg}$ may represent an averaging parameter specified by the ABS 110 based on the specific usage case; and 'n' may represent a number of consecutive frames in which no measurement may be made.

In one embodiment, to obtain the variance ($\sigma$), the expectation-squared statistic may be updated using Equations (4) and (5) below:

$$\hat{x}_{CINR}^2[k] = \begin{cases} |CINR[0]_{dB}|^2 & k = 0 \\ (1-\alpha_{avg})^{n+1}\hat{x}_{CINR}^2[k-1] + \\ (1-(1-\alpha_{avg})^{n+1})|CINR[k]_{dB}|^2 & k > 0 \end{cases} \quad \text{Equation (4)}$$

and $$\hat{\sigma}_{CINR}^2[k] = |\hat{x}_{CINR}^2[k] - \hat{\mu}_{CINR}^2[k]| \quad \text{Equation (5)}$$

Sir Mean and Varaince Measurements

When SIR measurements are mandated by the ABS, an AMS shall obtain a SIR measurement from the SA-preamble for UL OL power control. From a succession of these measurements, the AMS shall derive and update estimates of the SIR mean, and report them through Uplink Power Status Report Header. Mean statistics for SIR shall be reported in units of dB, following the quantization requirement in Uplink Power Status Report Header. The method used to estimate the SIR of a single measurement is left to individual implementation. The estimated SIR may be formulated without loss of generality as given in Equation (6) below:

$$SIR_{Inst}[k] = \sum_{j=1}^{N_r} SIR[k]_j = \sum_{j=1}^{N_r} \frac{P_{signal}[k]_j}{P_{interference}[k]_j} \quad \text{Equation (6)}$$

wherein $SIR[k]$ is the SIR for measurement k, $SIR[k]_j$ is SIR for measurement k at $j^{th}$ received antenna, $P_{signal}[k]_j$ is the signal power for measurement k at $j^{th}$ received antenna excluding SA-preamble boosting, $P_{interference}[k]_j$ is the interference power for measurement k at $j^{th}$ received antenna excluding SA-preamble boosting.

$N_r$ is the number of receive antennas at AMS

The estimation of the interference power is described in the equation (7) below:

$$P_{interference}[k]_j = P_{Seg0} \cdot P_{interference\_T_0}[k]_j + P_{Seg1} \cdot P_{interference\_T_1}[k]_j + P_{Seg2} \cdot P_{interference\_T_2}[k]_j \quad \text{Equation (7)}$$

wherein

Ts is a set of measurement indices derived from the SA-preamble tone indices of segment 's' (=0, 1, 2, . . . );

$P_{interference\_T_s}[k]_j$ is the interference power level of segment s at $j^{th}$ received antenna calculated from SA-preamble measurement.

$P_{Segi}$ is the linear power boosting or de-boosting level for segment 'i'.

For example, in reuse-1 deployment, $P_{Seg0}=P_{Seg1}=P_{Seg2}=1$. For segment 0 of reuse-3 deployment, $P_{Seg0}=1$ and $P_{Seg1}=P_{Seg2}=0$. For the power boosted reuse-3 partition of segment 0 in FFR deployment, $P_{Seg0}=$FP1_Power, $P_{Seg1}=$FP2_Power, $P_{Seg2}=$FP3_Power where FP1_Power is the linear power boosting level and FP2_Power and FP3_Power are linear power de-boosting levels.

The measured signal power for boosted reuse-3 FP may be multiplied by $P_{seg0}$ to obtain $P_{signal}[k]_j$. The mean SIR statistics (in decibels) may be determined from a multiplicity of single message using Equation (8) below:

$$SIR_{DL}[k]_{dB} = \begin{cases} SIR_{Inst}[0]_{dB} & k = 0 \\ (1-\alpha_{avg})^{n+1}SIR_{DL}[k-1]_{dB} + \\ (1-(1-\alpha_{avg})^{n+1})SIR_{Inst}[k]_{dB} & k > 0 \end{cases}$$ Equation (8)

wherein $SIR_{Inst}[k]_{dB} = 10\log_{10}(SIR_{Inst}[k])$ ;

$\alpha_{avg}$ is an averaging parameter specified by the ABS 110 based on a specific usage case; and n is the number of consecutive frames in which no measurement is made.

Downlink Noise and Interference Level (DL-NI) Mean and Varaince Measurements

In one embodiment, for downlink noise and interference (DL NI) level report through FFR-REP, which may responds to FFR-CMD instructed by the ABS 110, the AMS 130 may determine DL NI measurement from the SA-preamble (e.g., 505-1 to 505-3) for downlink FFR operation. From successive DL-NI measurements, the AMS 130 may determine and update estimates of the DL NI mean and variance, and report the estimated DL NI mean and variance using the FFR-REP message.

The approach used to estimate the DL NI of a single measurement is based on implementation of the AMS 130. In one embodiment, the estimated DL NI may be determined using Equation (9) below:

$$NI[k] = \frac{1}{N_r}\sum_{j=1}^{N_r} NI[k]_j = \frac{1}{N_r}\sum_{j=1}^{N_r}\left(P_{interference}[k]_j + P_{noise}[k]_j\right)$$ Equation (9)

wherein

NI[k] is the NI for measurement k, $NI[k]_j$ is NI for measurement k at $j^{th}$ received antenna, $P_{interference}[k]_j$ is the interference power for measurement k at $j^{th}$ received antenna excluding SA-preamble boosting.

$P_{noise}[k]_j$ is the noise power for measurement k at $j^{th}$ received antenna.

$N_r$ is the number of receive antennas at AMS

In one embodiment, the estimation of the noise power that may be measured from the interference-free region may be specific to implementation of the AMS 130. The estimation of the interference power may be determined using the Equation (10) below.

$P_{interference}[k]_j = P_{Seg0} \cdot P_{interference\_T_0}[k]_j + P_{Seg1} \cdot P_{interference\_T_1}[k]_j + P_{Seg2} \cdot P_{interference\_T_2}[k]_j$ Equation (10)

wherein

Ts may represent a set of measurement indices derived from the SA-preamble (e.g., 505-1 to 505-3) tone indices of segment 's' (=0,1, 2 . . . );

$P_{interference\_T_s}[k]_j$ is the interference power level of segment s at $j^{th}$ received antenna calculated from SA-preamble measurement;

$P_{Segi}$ is the linear power boosting or de-boosting level for segment i. For example, in reuse 1 deployment, $P_{Seg0}=P_{Seg1}=P_{Seg2}=1$. For segment 0 of reuse 3 deployment, $P_{Seg0}=1$ and $P_{Seg1}=P_{Seg2}=0$. For the power boosting reuse 3 partition of segment 0 in FFR deployment, $P_{Seg0}$=FP1_Power, $P_{Seg1}$=FP2_Power, $P_{seg2}$=FP3_Power where FP1_Power is the linear power boosting level and FP2_Power and FP3_Power are linear power de-boosting levels.

For NI measurement, reuse-1 frequency partition may be used. The mean NI statistics (in decibels) shall be derived from a multiplicity of single message using Equation (11).

$$\hat{\mu}_{NI}[k] = \begin{cases} NI[0]_{dB} & k = 0 \\ (1-\alpha_{avg})^{n+1}\hat{\mu}_{NI}[k-1] + \\ (1-(1-\alpha_{avg})^{n+1})NI[k]_{dB} & k > 0 \end{cases}$$ Equation (11)

wherein $NI[k]_{dB} = 10\log_{10}(NI[k])$;

$\alpha_{avg}$ may represent an averaging parameter specified by the ABS 110 based on the specific usage case; and n may represent the number of consecutive frames in which no measurement is made. To obtain the variance, the expectation-squared statistic may be updated using Equations (12) and (13)

$$\hat{x}_{NI}^2[k] = \begin{cases} |NI[0]_{dB}|^2 & k = 0 \\ (1-\alpha_{avg})^{n+1}\hat{x}_{NI}^2[k-1] + \\ (1-(1-\alpha_{avg})^{n+1})|NI[k]_{dB}|^2 & k > 0 \end{cases}$$ Equation (12)

and $\hat{\sigma}_{NI}^2[k] = |\hat{x}_{NI}^2[k] - \hat{\mu}_{NI}^2[k]|$ Equation (13)

Figure 6:
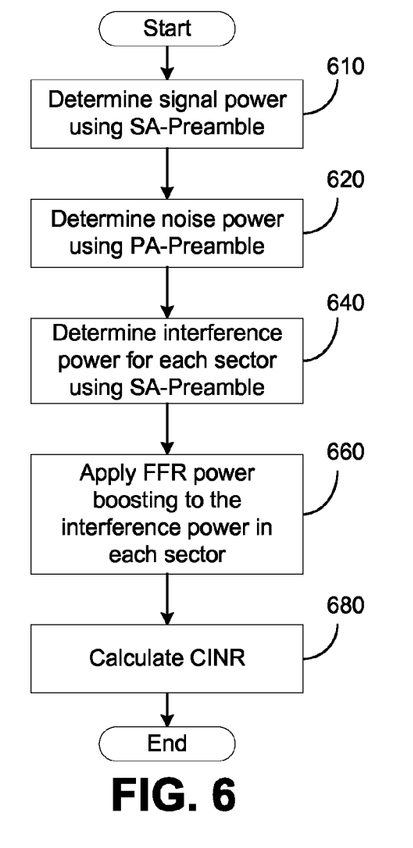
FIG. 6 is a flow-chart, which illustrates an approach to estimate CINR in accordance with one embodiment.

An embodiment of a flow-chart depicting an approach used by the CINR estimation block 251 to determine the CINR values is illustrated in FIG. 6. In block 610, the CINR estimation block 251 may determine the signal power using one or more of the SA-preambles 505-1, 505-2, and 505-3. In one embodiment, the CINR estimation block 251 may measure the signal power using the occupied signal tones (such as 421, 432, and 443 depicted in FIG. 4) of within one or more of the SA-preambles 505-1 to 505-3 as described in Equation (1) above ($P_{signal}[k]_j$ is the signal power for measurement k at $j^{th}$ received antenna excluding SA-preamble boosting).

In block 620, the CINR estimation block 251 may determine the noise power using the un-occupied tones of the PA-preamble 503. For example, every alternate tone in the PA-preamble 503 may be occupied in the central 5 MHz channel and the tones other than the occupied tones may be used to determine noise power. In one embodiment, the noise power $P_{noise}[k]_j$ may be determined from the interference-free region specific to the implementation of the AMS 130.

In block 640, the CINR estimation block 251 may determine the interference power for each sector using SA-preamble. In one embodiment, the CINR estimation block 251 may determine the interference power $P_{interference}[k]_j$ using Equation (2) above. In one embodiment, the interference power may be determined using the both the un-occupied tones and the occupied tones. For example, the CINR estimation block 251 may determine the interference using the occupied tone 421 and two un-occupied tones 431 and 441 in FIG. 4.

In block 660, the CINR estimation block 251 may apply FFR power boosting to the interference power in each sector (0,1, 2) using the average power of each of the cells 310, 320, 330, and 350. In one embodiment, if the power level for each sector (0, 1, 2) in each of the cells 310, 320, 330, and 350 are the same, the CINR estimation may provide an estimated CINR value, which may substantially equal to the actual CINR value. However, if the power level for each sector (0, 1, 2) in each of the cells 310, 320, 330, and 350 are different, the CINR estimation may provide an estimated CINR value, which may be approximation of the actual CINR value. In block 680, the CINR estimation block 251 may determine the mean CINR values using the Equation (3) above and the variance CINR values using the Equations (4) and (5) above.

Figure 7:
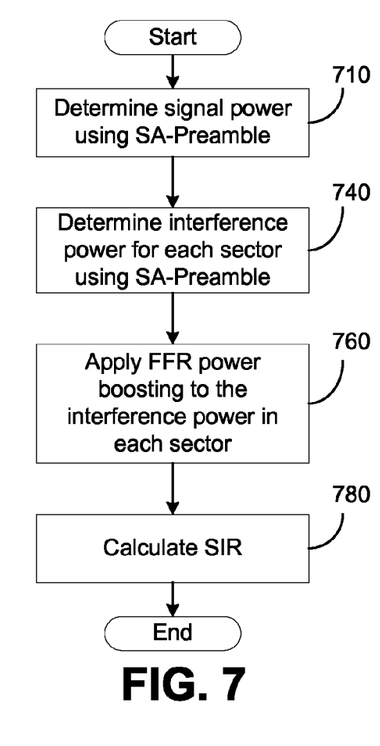
FIG. 7 is a flow-chart, which illustrates an approach to estimate Signal to Interference ratio (SIR) in accordance with one embodiment.

An embodiment of a flow-chart depicting an approach used by the SIR estimation block 254 to determine the SIR values is illustrated in FIG. 7. In block 710, the SIR estimation block 254 may determine the signal power using one or more of the SA-preambles 505-1, 505-2, and 505-3. In one embodiment, the SIR estimation block 254 may measure the signal power using the occupied signal tones (such as 421, 432, and 443 depicted in FIG. 4) of within one or more of the SA-preambles 505-1 to 505-3 using the Equation (6) above ($P_{signal}[k]_j$ is the signal power for measurement k at $j^{th}$ received antenna excluding SA-preamble boosting).

In block 740, the SIR estimation block 254 may determine the interference power for each sector using SA-preambles 505-1 to 505-3. In one embodiment, the SIR estimation block 254 may determine the interference power $P_{interference}[k]_j$ using Equation (7) above. In one embodiment, the interference power may be determined using the both the un-occupied tones and the occupied tones. For example, the SIR estimation block 254 may determine the interference using the occupied tone 421 and two un-occupied tones 431 and 441 in FIG. 4.

In block 760, the SIR estimation block 254 may apply FFR power boosting to the interference power in each sector (0,1, 2) of each of the cells 310, 320, 330, and 350. In block 780, the SIR estimation block 254 may determine the mean SIR values using the Equation (8).

Figure 8:
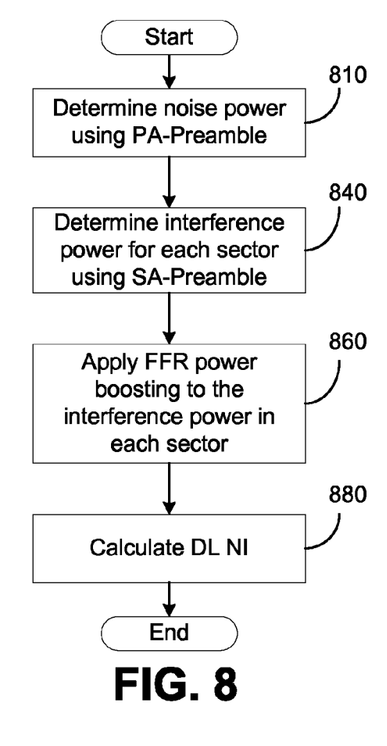
FIG. 8 is a flow-chart, which illustrates an approach to estimate downlink Noise Interference (NI) in accordance with one embodiment.

An embodiment of a flow-chart depicting an approach used by the DL NI estimation block 258 to determine the DL NI values is illustrated in FIG. 8. In block 810, the DL NI estimation block 258 may determine the noise power using the un-occupied tones of the PA-preamble 503. For example, every alternate tone in the PA-preamble 503 may be occupied in the central 5 MHz channel and the tones other than the occupied tones may be used to determine noise power. In one embodiment, the noise power $P_{noise}[k]_j$ may be determined from the interference-free region specific to the implementation of the AMS 130.

In block 840, the DL NI estimation block 258 may determine the interference power for each sector using SA-preambles 505. In one embodiment, the DL NI estimation block 258 may determine the interference power $P_{interference}[k]_j$ using Equation (10) above. In one embodiment, the interference power may be determined using the both the un-occupied tones and the occupied tones. For example, the CINR estimation block 251 may determine the interference using the occupied tone 421 and two un-occupied tones 431 and 441 in FIG. 4.

In block 860, the DL NI estimation block 258 may apply FFR power boosting to the interference power in each sector (0,1, 2) using the average power of each of the cells 310, 320, 330, and 350. In one embodiment, if the power level for each sector (0, 1, 2) in each of the cells 310, 320, 330, and 350 are the same, the DL NI estimation may provide an estimated DL NI value, which may substantially equal to the actual DL NI value. However, if the power level for each sector (0, 1, 2) in each of the cells 310, 320, 330, and 350 are different, the DL NI estimation may provide an estimated DL NI value, which may be approximation of the actual DL NI value. In block 880, the DL NI estimation block 258 may determine the mean DL NI values using the Equation (11) above and the variance DL NI values using the Equations (12) and (13) above.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to determine signal quality values in a wireless network, comprising:
    determining a signal power value of a signal received from a plurality of antennas using a second preamble included in a super-frame of the signal, wherein the second preamble includes cell information;
    determining a noise power value of the signal received from the plurality of antennas using a first preamble included in the super-frame of the signal, wherein the first preamble includes carrier information;
    determining an interference power value of each sector within a cell using the second preamble, the interference power value of at least one sector of the cell determined using both unoccupied and occupied tones;
    applying fractional frequency reuse power boosting to the interference power in each sector within the cell using an average power for each of multiple cells; and
    determining a carrier to interference-plus-noise ratio (CINR) for the signal using the power-boosted interference powers.

2. The method of claim 1, wherein the second preamble further comprises segment identifier values and cell identifier values, which is used to determine the signal power value and the interference power value.

3. The method of claim 1, wherein the first preamble further comprises bandwidth information of a wireless apparatus determining the signal quality values, wherein the carrier information and the bandwidth information is used to determine the noise power value.

4. The method of claim 2 further comprises partitioning the segment identifier values and the cell identifier values to support one or more base stations.

5. The method of claim 2 further comprises using one or more occupied frequency partitions in the second preamble to determine the signal power value.

6. The method of claim 1 further comprises using unoccupied frequency partitions in the first preamble to determine the noise power value.

7. The method of claim 1 further comprise using both un-occupied frequency partitions and occupied frequency partitions in the second preamble to determine the interference power value.

8. The method of claim 1 further comprises determining a mean and a variance value of a carrier to interference plus noise ratio value using the signal power value, the noise power value, and the interference power value.

9. The method of claim 1 further comprises determining a mean value of a signal to interference ratio value using the signal power value and the interference power value.

10. The method of claim 1 further comprises determining a mean value and variance value of a downlink noise and interference ratio value using the noise power value and the interference power value.

11. A mobile station to determine signal quality values in a wireless network, comprising:
    a host device;
    a transmitter coupled to a plurality of antennas and the host; and a receiver coupled to the plurality of antennas and the host device, wherein the receiver is to:

determine a signal power value of a signal received from a plurality of antennas using a second preamble included in a super-frame of the signal, wherein the second preamble includes cell information;

determine a noise power value of the signal received from the plurality of antennas using unoccupied orthogonal frequency division multiple access (OFDMA) tones of a first preamble included in the super-frame of the signal, wherein the first preamble includes carrier information;

determine an interference power value of each sector within a cell using the second preamble, the interference power value of at least one sector of the cell determined using both unoccupied and occupied tones;

apply fractional frequency reuse power boosting to the interference power in each sector within the cell using an average power for each of multiple cells; and determine a carrier to interference-plus-noise ratio (CINR) for the signal using the power-boosted interference powers.

12. The mobile station of claim 11, wherein the receiver is to use segment identifier values and cell identifier values of the second preamble to determine the signal power value and the interference power value.

13. The mobile station of claim 12, wherein the segment identifier values and the cell identifier values are partitioned to support one or more base stations.

14. The mobile station of claim 12, wherein the receiver is to use one or more occupied tones in the second preamble to determine the signal power value.

15. The mobile station of claim 11, wherein the receiver is to use bandwidth information and the carrier information to determine the noise power value.

16. The mobile station of claim 11, wherein the receiver is to use un-occupied tones in the first preamble to determine the noise power value.

17. The mobile station of claim 11, wherein the receiver is to use both un-occupied tones and occupied tones in the second preamble to determine the interference power value.

18. The mobile station of claim 11, wherein the receiver further comprises a carrier to interference plus noise ratio estimation block, wherein the carrier to interference plus noise ratio estimation block is to determine a mean and a variance value of a carrier to interference plus noise ratio value using the signal power value, the noise power value, and the interference power value.

19. The mobile station of claim 11, wherein the receiver further comprises a signal to interference ratio estimation block, wherein the signal to interference ratio estimation block is to determine a mean value of a signal to interference ratio value using the signal power value and the interference power value.

20. The mobile station of claim 11, wherein the receiver further comprises a downlink noise and interference estimation block, wherein the downlink noise and interference estimation block is to determine a mean value and variance value of a downlink noise and interference ratio value using the noise power value and the interference power value.

* * * * *